(12) United States Patent
McSherry et al.

(10) Patent No.: US 9,165,035 B2
(45) Date of Patent: Oct. 20, 2015

(54) DIFFERENTIAL DATAFLOW

(75) Inventors: Frank D. McSherry, San Francisco, CA (US); Rebecca Isaacs, San Francisco, CA (US); Michael A. Isard, San Francisco, CA (US); Derek G. Murray, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 319 days.

(21) Appl. No.: 13/468,726

(22) Filed: May 10, 2012

(65) Prior Publication Data

US 2013/0304744 A1  Nov. 14, 2013

(51) Int. Cl.
*G06F 17/30* (2006.01)

(52) U.S. Cl.
CPC .... *G06F 17/30516* (2013.01); *G06F 17/30554* (2013.01); *G06F 17/30958* (2013.01)

(58) Field of Classification Search
CPC .............. G06F 17/30516; G06F 17/30554; G06F 17/30958
USPC ................................................. 707/741, 798
See application file for complete search history.

(56) References Cited

U.S. PATENT DOCUMENTS

| | | | |
|---|---|---|---|
| 5,535,393 A | 7/1996 | Reeve et al. | |
| 6,058,385 A * | 5/2000 | Koza et al. | 706/13 |
| 6,253,371 B1 | 6/2001 | Iwasawa et al. | |
| 6,370,685 B1 * | 4/2002 | Robison | 717/141 |
| 6,772,415 B1 | 8/2004 | Danckaert et al. | |
| 7,263,694 B2 | 8/2007 | Clewis et al. | |
| 8,141,049 B2 * | 3/2012 | Kahlon | 717/126 |
| 8,176,470 B2 * | 5/2012 | Klumpp et al. | 717/109 |
| 2005/0114842 A1 * | 5/2005 | Fleehart et al. | 717/126 |
| 2006/0277391 A1 * | 12/2006 | Bittner, Jr. | 712/25 |
| 2009/0083722 A1 | 3/2009 | Eichenberger et al. | |
| 2010/0088490 A1 | 4/2010 | Chakradhar et al. | |
| 2011/0276962 A1 * | 11/2011 | Chambers et al. | 718/1 |
| 2011/0314444 A1 | 12/2011 | Zhang et al. | |
| 2012/0185449 A1 * | 7/2012 | Gould et al. | 707/695 |
| 2012/0254597 A1 | 10/2012 | Delling et al. | |
| 2013/0067443 A1 * | 3/2013 | Howard | 717/149 |
| 2014/0172939 A1 | 6/2014 | McSherry et al. | |

OTHER PUBLICATIONS

Baden et al., Lattice Parallelism: A Parallel Programming Model for Manipulating Non-Uniform Structured Scientific Data Structures, Jan. 1993, ACM, vol. 28, Issue 1, pp. 24-27.*
Baden et al., Lattice Parallelism: A Parallel Programming Model for Manipulating Non-Uniform Structured Scientific Data Structures, Sep. 1992, pp. 1-22.*
Bhatotia et al., "Incoop: MapReduce for Incremental Computations," In ACM SOCC, Oct. 2011, 14 pages.

(Continued)

*Primary Examiner* — Jorge A Casanova
(74) *Attorney, Agent, or Firm* — Micah Goldsmith; Judy Yee; Micky Minhas

(57) ABSTRACT

The techniques discussed herein efficiently perform data-parallel computations on collections of data by implementing a differential dataflow model that performs computations on differences in the collections of data. The techniques discussed herein describe defined operators for use in a data-parallel program that performs the computations on the determined differences between the collections of data by creating a lattice and indexing the differences in the collection of data according to the lattice.

18 Claims, 6 Drawing Sheets

(56) References Cited

OTHER PUBLICATIONS

Bierman et al., "Lost in Translation: Formalizing Proposed Extensions to C," In 22nd ACM OOPSLA, Oct. 2007, 20 pages.
Bu et al., "HaLoop: Efficient Iterative Data Processing on Large Clusters," In 36th VLDB, Sep. 2010, 12 pages.
Davis et al., "Data Flow Program Graphs," IEEE Computer, Feb. 1982, 16 pages.
Dean et al., "MapReduce: Simplified Data Processing on Large Clusters," In 6th USENIX OSDI, Dec. 2004, 13 pages.
Ekanayake et al., "Twister: A Runtime for Iterative MapReduce," In 19th ACM HPDC, Jun. 2010, 9 pages.
G. E. Blelloch, "Programming Parallel Algorithms," Communications of the ACM, Mar. 1996, 13 pages.
Gedik et al., "SPADE: The System S Declarative Stream Processing Engine," In 2008 ACM SigMod, Jun. 2008, 12 pages.
Gunda et al., "Nectar: Automatic Management of Data and Computation in Datacenters," In 9th USENIX OSDI, Oct. 2010, 14 pages.
Isard et al., "Dryad: Distributed Data-Parallel Programs from Sequential Building Blocks," In EuroSys, Mar. 2007, 14 pages.
Lee et al., "Sychronous Data Flow," Proceedings of the IEEE, Sep. 1987, 11 pages.
Leskovec et al., "The Dynamics of Viral Marketing," ACM Transactions on the Web, May 2007, 12 pages.
Logothetis et al., "Stateful Bulk Processing for Incremental Analytics," Published Date: Jun. 2010, Proceedings: 1st ACM symposium on Cloud computing, SoCC'10, 12 pages.
Murray et al., "CIEL: A Universal Execution Engine for Distributed Data-Flow Computing," In 8th USENIX NSDI, Mar. 2011, 14 pages.
Olston et al., "Pig Latin: A Not-So-Foreign Language for Data Processing," In 2008 ACM SigMod, Jun. 9-12, 2008, 12 pages.
Ranger et al., "Evaluating MapReduce for Multi-Core and Multiprocessor Systems," In 13th HPCA, Feb. 2007, 12 pages.
Stone et al., "Automatic Determination of May/Must Set Usage in Data-Flow Analysis," Eighth IEEE International Working Conference on Source Code Analysis and Manipulation, Sep. 2008, 10 pages.
Thies et al., "StreaMIT: A language for Streaming Applications," In 2002 ICCC, Apr. 2002, 17 pages.
U. A. Acar, "Self-Adjusting Computation," PhD thesis, Carnegie Mellon University, May 2005, 75 pages.
Yu et al., "DryadLINQ: A System for General-Purpose Distributed Data-Parallel Computing Using a High-Level Language," In 8th USENIX OSDI, Dec. 2008, 14 pages.
Zaharia et al., "Resilient Distributed Datasets: A fault-Tolerant Abstraction for In-Memory Cluster Computing," Electrical Engineering and Computer Sciences, University of California at Berkeley, Jul. 2011, 18 pages.
Zhang et al., "iMapReduce: A Distributed Computing Framework for Iterative Computation," In 1st International Workshop on Data Intensive Computing in the Clouds, May 2011, 10 pages.
Zhang et al., "PrIter: A Distributed Framework for Prioritized Iterative Computations," In ACM SOCC, Oct. 2011, 14 pages.
U. A. Acar, "Self-Adjusting Computation", PhD thesis, Carnegie Mellon University, May 2005, 75 pages.
Alvaro et al., "Consistency Analysis in Bloom: a CALM and Collected Approach", retrieved on Nov. 22, 2012 at <<http://www.cs.berkeley.edu/~palvaro/cidr11.pdf>>, Proceedings of 5th Biennial Conference on Innovative Data Systems Research, Jan. 9, 2011, 12 pages.
Apache. Hadoop MapReduce. retreived on Dec. 17, 2012, <<http://hadoop.apache.org/index.html>>The Apache Software Foundation, Dec. 5, 2012, 4 pages.
Arvind, et al: "Executing a Program on the Mit Tagged-Token Dataflow Architecture", IEEE Transactions on Computers, vol. 39, No. 3, Mar. 1, 1990, pp. 300-318.
Barga et al., "Consistent Streaming Through Time: A Vision for Event Stream Processing", retrieved on Nov. 22, 2012 at <<http://research.microsoft.com/pubs/156569/cidr07p42.pdf>>, 3rd Biennial Conference on Innovative Data Systems Research, Jan. 7, 2007, 12 pages.
Bhatotia et al., "Incoop: MapReduce for Incremental Computations", retrieved on Nov. 22, 2012 at <<http://www.mpi-sws.org/~rodrigo/socc11-incoop.pdf>>, In ACM SOCC, Oct. 2011, 14 pages.
Bierman et al., "Lost in Translation: Formalizing Proposed Extensions to C#", retrieved at <<http://research.microsoft.com/en-us/um/people/emeijer/Papers/oopslafp017-bierman.pdf>>, In 22nd ACM OOPSLA, Oct. 2007, 20 pages.
G. E. Blelloch, "Programming Parallel Algorithms", Communications of the ACM, Mar. 1996, 13 pages.
Bu et al., "HaLoop: Efficient Iterative Data Processing on Large Clusters", retrieved at <<http://homes.cs.washington.edu/~billhowe/pubs/HaLoop.pdf>>, In 36th VLDB, Sep. 2010, 12 pages.
Chambers et al.,"FlumeJava: Easy, Efficient Data-Parallel Pipelines", retrieved on Nov. 22, 2012 at <<http://pages.cs.wisc.edu/~akella/CS838/F12/838-CloudPapers/FlumeJava.pdf>>, Proceedings of ACM SIGPLAN Conference on Programming Language Design and Implementation, Jun. 5, 2010, 13 pages.
Chandramouli et al., "On-The-Fly Progress Detection in Iterative Stream Queries", retrieved on Nov. 22, 2012 at <<http://research.microsoft.com/pubs/101567/FFP-2009-carnera.pdf>>, Proceedings of the VLDB Endowment, vol. 2, No. 1, Aug. 24, 2009, 12 pages.
Chandy et al., "Termination Detection of Diffusing Computations in Communicating Sequential Processes", TR-144, Apr. 1980, 16 pages.
Cheng et al., "Kineograph: Taking the Pulse of a Fast-Changing and Connected World", retrieved on Nov. 22, 2012 at <<http://www.fever.ch/usbkey_eurosys12/papers/p85-chengPS.pdf>>, Proceedings of the 7th ACM European Conference on Computer Systems, Apr. 10, 2012, 14 pages.
Condie et al., "MapReduce Online", retrieved on Nov. 22, 2012 at <<http://static.usenix.org/events/nsdi10/tech/full_papers/condie.pdf>>, Proceedings of 7th USENIX Symposium on Networked Systems Design and Implementation, Apr. 28, 2010, 15 pages.
Davis et al., "Data Flow Program Graphs", IEEE Computer, Feb. 1982, 16 pages.
Dean et al., "MapReduce: Simplified Data Processing on Large Clusters", retrieved at <<http://www.rendezvouswithdestiny.net/index_files/mapreduce-osdi04.pdf>>, In 6th USENIX OSDI, Dec. 2004, 13 pages.
Dijkstra, et al., "Termination Detection for Diffusing Computations", In Information Proceeding Letters, vol. 11, No. 1, Aug. 1980, 6 pages.
Ekanayake et al., "Twister: A Runtime for Iterative MapReduce", retrieved at <<http://grids.ucs.indiana.edu/ptilupages/publications/hpdc-camera-ready-submission.pdf>>, In 19th ACM HPDC, Jun. 2010, 9 pages.
Fidge, "Timestamps in Message-Passing Systems That Preserve the Partial Ordering", retrieved on Nov. 22, 2012 at <<http://zoo.cs.yale.edu/classes/cs426/2012/lab/bib/fidge88timestamps.pdf>>, Proceedings of the Australian Computer Science Conference, vol. 10, No. 1, Feb. 3, 1988, 11 pages.
Gedik et al., "SPADE: The System S Declarative Stream Processing Engine", retrieved at <<http://citeseerx.ist.psu.edu/viewdoc/download?doi=10.1.1.160.7187&rep=rep1&type=pdf>>, In 2008 ACM SigMod, Jun. 2008, 12 pages.
Gunda et al., "Nectar: Automatic Management of Data and Computation in Datacenters", retrieved at <<http://static.usenix.org/event/osdi10/tech/full_papers/Gunda.pdf>>, In 9th USENIX OSDI, Oct. 2010, 14 pages.
Isard et al., "Dryad: Distributed Data-Parallel Programs from Sequential Building Blocks"; retrieved at <<http://adrian.idv.hk/lib/exe/fetch.php/paper/ibybf07-dryad.pdf>>, In EuroSys, Mar. 2007, 14 pages.
Kumar et al., "Structure and Evolution of Online Social Networks", retrieved on Nov. 22, 2012 at <<http://studystream.org/upload/data/687/Kumar%20%20structure%20and%20evolution%20of%20%20online%20%20Social%20Network.pdf>>, Proceedings of the 12 ACM SIGKDD International Conference on Knowledge Discovery and Data Mining, Aug. 20, 2006, 7 pages.
Lee et al., "Sychronous Data Flow", Proceedings of the IEEE, Sep. 1987, 11 pages.

(56) References Cited

OTHER PUBLICATIONS

Leskovec et al., "The Dynamics of Viral Marketing", ACM Transactions on the Web, May 2007, 12 pages.
Logothetis et al., "Stateful Bulk Processing for Incremental Analytics", Published Date: Jun. 2010, Proceedings: 1st ACM symposium on Cloud computing, SoCC'10, 12 pages.
Mahajan et al., "Analyzing the MAC-level Behavior of Wireless Networks in the Wild", retrieved on Nov. 22, 2012 at <<http://www.cse.cuhk.edu.hk/~cslui/CSC7221/sigcomm2006_analyze_mac_wireless.pdf>>, Proceedings of the Conference on Applications, Technologies, Architectures, and Protocols for Computer Communications, Sep. 11, 2006, 12 pages.
Malewicz et al., "Pregel: A System for Large-Scale Graph Processing", retrieved on Nov. 22, 2012 at <<https://cs.uwaterloo.ca/~kdaudjee/courses/cs848/papers/malewicz10.pdf>>, Proceedings of ACM SIGMOD International Conference on Management of Data, Jun. 6, 2010, 11 pages.
Mattern, "Virtual Time and Global States of Distributed Systems", retrieved on Nov. 22, 2012 at <<http://citeseerx.ist.psu.edu/vievdoc/download?doi=10.1.1.63.4399&rep=rep1&type=pdf>>, Proceedings of the International Workshop on Parallel and Distributed Algorithms; Oct. 1988, 15 pages.
McSherry et al., "Composable Incremental and Iterative Data-Parallel Computation with Naiad", retrieved on Nov. 22, 2012 at <<http://research.microsoft.com/pubs/174076/naiad.pdf>>, Microsoft Research Technical Report, MSR-TR-2012-105, Oct. 9, 2012, 20 pages.
McSherry et al.; "Differential dataflow", 6th Biennial Conference on Innovative Data Systems Research (CIDR'13), Jan. 6-9, 2012, 12 pages.
McSherry, et al: "Naiad: The Animating Spirit of Rivers and Streams", Poster Session of the 23nrd Symposium on Operating System Principles, Oct. 24, 2012, pp. 1-2.
Murray et al., "CIEL: A Universal Execution Engine for Distributed Data-Flow Computing", retrieved at <<http://static.usenix.org/event/nsdi11/tech/full_papers/Murray.pdf>>, In 8th USENIX NSDI, Mar. 2011, 14 pages.
Murray, et al: "Naiad: A Timely Dataflow System", Proceedings of the Twenty-Fourth ACM Symposium on Operating Systems Principles, Jan. 1, 2013, pp. 439-455.
Murray, "Scripting the Cloud with Skywriting", retrieved on Nov. 22, 2012 at <<http://static.usenix.org/event/hotcloud10/tech/full_papers/Murray.pdf>>, Proceedings of 2nd USENIX Conference on Hot Topics in Cloud Computing, Jun. 22, 2010, 7 pages.
Najork et al., "Of Hammers and Nails: An Empirical Comparison of Three Paradigms for Processing Large Graphs", retrieved on Nov. 22, 2012 at <<http://www.sreenivasgollapudi.com/pubs/wsdm2012a.pdf>>, Proceedings of 5th ACM International Conference on Web Search and Data Mining, Feb. 8, 2012, 10 pages.
Najork, "The Scalable Hyperlink Store", retrieved on Nov. 22, 2012 at <<http://citeseerx.ist.psu.edu/viewdoc/download?doi=10.1.1.149.9059&rep=rep1&type=pdf>>, Proceedings of 20th ACM Conference on Hypertext and Hypermedia, Jun. 29, 2009, 10 pages.
Olston et al., "Generating Example Data for Dataflow Programs", retrieved on Nov. 22, 2012 at <<http://www.cs.albany.edu/~jhh/courses/readings/olston.sigmod09.example.pdf>>, Proceeding of ACM SIGMOD International Conference on Management of Data, Jun. 29, 2009, 12 pages.
Olston et al., "Pig Latin: A Not-So-Foreign Language for Data Processing", In 2008 ACM SigMod, Jun. 9-12, 2008, 12 pages.

PCT International Search Report and Written Opinion from corresponding PCT Application No. PCT/US2013/075790, dated Apr. 25, 2014, 16 pages.
Peng et al., "Large-scale Incremental Processing Using Distributed Transactions and Notifications", retrieved at <<http://static.usenix.org/event/osdi10/tech/full_papers/Peng.pdf>>, Proceedings of 9th USENIX Conference on Operating Systems Design and Implementation, Oct. 4, 2010, 14 pages.
Power et al., "Piccolo: Building Fast, Distributed Programs with Partitioned Tables", retrieved on Nov. 22, 2012 at <<http://static.usenix.org/event/osdi10/tech/full_papers/Power.pdf>>, Proceedings of 9th USENIX Conference on Operating Systems Design and Implementation, Oct. 4, 2010, 14 pages.
"PrIter Distributed Computing Framework for Prioritized Iteration", retrieved on Nov. 22, 2012 at <<http://code.google.com/p/priter/>>, 3 pages.
Ranger et al., "Evaluating MapReduce for Multi-Core and Multiprocessor Systems", In 13th HPCA, Feb. 2007, 12 pages.
Singh et al., "Automated Worm Fingerprinting", retrieved on Nov. 22, 2012 at <<http://www.csd.uoc.gr/~hy558/papers/earlybird.pdf>>, Proceedings of 6th Conference on Symposium on Operating Systems Design and Implementation, vol. 6, Dec. 5, 2004, 16 pages.
Stone et al., "Automatic Determination of May/Must Set Usage in Data-Flow Analysis", Eighth IEEE International Working Conference on Source Code Analysis and Manipulation, Sep. 2008, 10 pages.
Thies et al., "StreaMIT: A language for Streaming Applications", In 2002 ICCC, Apr. 2002, 17 pages.
Tucker et al., "Exploiting Punctuation Semantics in Continuous Data Streams", retrieved on Nov. 22, 2012 at <<http://ieeexplore.ieee.org/stamp/stamp.jsp?tp=&arnumber=1198390>>, Journal of IEEE Transactions on Knowledge and Data Engineering, vol. 15, No. 3, May 2003, 14 pages.
Yu et al., "DryadLINQ: A System for General-Purpose Distributed Data-Parallel Computing Using a High-Level Language", retrieved at <<http://www-users.cselabs.umn.edu/classes/Fall-2012/csci8980-2/papers/dryadLINQ.pdf>>, In 8th USENIX OSDI, Dec. 2008, 14 pages.
Zaharia et al., "Resilient Distributed Datasets: A fault-Tolerant Abstraction for In-Memory Cluster Computing", retrieved at <<http://www.mosharaf.com/wp-content/uploads/spark-nsdi12.pdf>>, Electrical Engineering and Computer Sciences, University of California at Berkeley, Jul. 2011, 18 pages.
Zhang et al., "iMapReduce: A Distributed Computing Framework for Iterative Computation", retrieved at <<http://rio.ecs.umass.edu/mnilpub/papers/DataCloud2011_iMapReduce.pdf>>, In 1st International Workshop on Data Intensive Computing in the Clouds, May 2011, 10 pages.
Zhang et al., "PrIter: A Distributed Framework for Prioritized Iterative Computations", retrieved at <<http://www-users.cselabs.umn.edu/classes/Fall-2012/csci8980-2/papers/priter.pdf>>, In ACM SOCC, Oct. 2011, 14 pages.
McSherry, Frank, "A Uniform Approach to Accelerated PageRank Computation", retrieved on Nov. 22, 2012 at <<http://delab.csd.auth.gr/~dimitris/courses/ir_spring06/page_rank_computing/p575-mcsherry.pdf>>, In Proceedings of the 14th International Conference on World Wide Web, May 10, 2005, 8 pages.
PCT 2nd Written Opinion mailed Oct. 10, 2014 for PCT Application No. PCT/US2013/075790, 7 Pages.

\* cited by examiner

DIFFERENTIAL DATAFLOW

BACKGROUND

Real world systems, such as a social network system or a roadmap/GPS system, comprise collections of data. Dataflow graphs are used to model the processing being performed on the collections of data so that dataflow processing can be performed as the collections of data change over time. Declarative computer programming allows a computer programmer to define, in a data-parallel program, a set of computations and input/output dependencies between the computations. The set of computations and input/output dependencies defined in a data-parallel program are modeled by the dataflow graph. Accordingly, a dataflow graph provides a representation of different functional paths that might be traversed through a data-parallel program during execution, such that collections of data pertaining to real world systems can be processed and updated as they change over time.

Conventionally, the set of computations used in a data-parallel program are batch-oriented and loop-free, resulting in inefficient performance for data streaming and incremental computational updates to the collections of data for a particular model system (e.g., a social network system or a roadmap/GPS system). For instance, batch-processing retains no previous state of data and/or computations and therefore, batch-oriented systems must reprocess entire collections of data even when the incremental changes that occur over time are minor or small. Meanwhile, loop-free data-parallel programs cannot perform iterations (e.g., loops or nested-loops) when processing an incremental update to a particular model system.

SUMMARY

The techniques discussed herein efficiently perform data-parallel computations on collections of data by implementing a differential dataflow model that performs computations on differences in the collections of data. The techniques discussed herein describe defined operators for use in a data-parallel program that performs the computations on the determined differences in the collections of data by creating a lattice and indexing the differences in the collection of data according to the lattice.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, and/or technique(s) as permitted by the context above and throughout the document.

BRIEF DESCRIPTION OF THE CONTENTS

The detailed description is presented with reference to accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
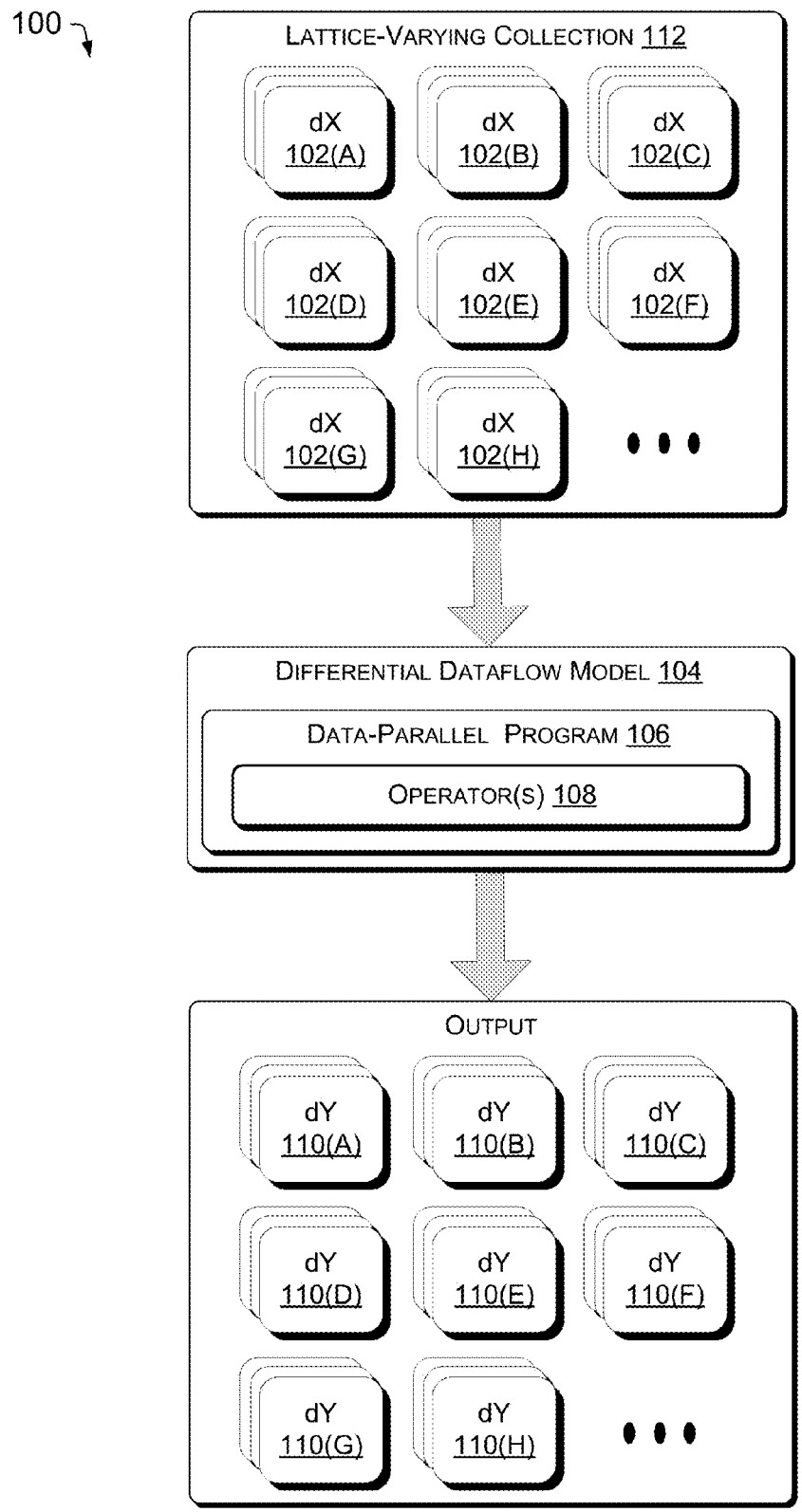
FIG. 1 illustrates an example overview of the techniques discussed herein, in accordance with various embodiments described.

The following description sets forth techniques for efficiently performing data-parallel computations on collections of data by implementing a differential dataflow model that performs computations on differences between the collections of data instead of re-performing the computations on the entire collections of data. The techniques discussed herein describe defined operators for use in a data-parallel program that performs the computations on the determined differences between the collections of data by creating a lattice and indexing or arranging the determined differences according to the lattice.

Collections of data describe a totality of data pertaining to a real world system at a particular place in a data-parallel program (e.g., the state of the totality of data before or after one or more particular computations). In various embodiments, collections of data pertaining to a real world system can be described as multiple independent sub-collections of data. By focusing on differences between collections of data (e.g., determining which ones of the independent sub-collections of data that have changed), the differential dataflow model can efficiently implement incremental updates, nested fixed-point iteration, and prioritized execution of a dataflow graph by re-using previous data and previous computations that remain a valid part of a maintained state for a model system rather than redundantly performing computations on the sub-collections of data that have not changed from the previous, maintained state. Accordingly, when new data is added to a model system or data changes as a result of a computation in a data-parallel program, for example, the amount of processing implemented by the differential dataflow model is proportional to a number of sub-collections of data that represent the new data or the changed data from a previous computation.

The number of sub-collections of data that represent the new data or the changed data is typically smaller than the total number of sub-collections of data in the collections of data that comprise the totality of data in a real world system. Thus, the differential dataflow model discussed herein avoids computational redundancy for data-parallel programs and makes the data-parallel programs more efficient.

While some conventional approaches to data-parallel computations consider and process changes to data, such changes occur in a one-dimensional, single order of time. Changes in a one-dimensional, single order of time are referred to as "totally ordered" changes based on a linear perception of time, where a first change to a collection of data is known to definitely come before or after another change to the collection of data (e.g., in a linear fashion). However, conventional data-parallel programs cannot efficiently and accurately perform data-parallel computations on a "partially ordered" set of changes. In a partially ordered set of changes, a first change to a sub-collection of data may not be directly comparable to a second change to the sub-collection of data (e.g., in a time-wise linear fashion). For instance, a change to a sub-collection of data may be in a second dimension independent of or in addition to an initial dimension of linear time. Thus, conventional data-parallel programs must impose a total order on the changes, which loses useful information about the structure of the changes, and restricts these programs to using a less-efficient execution strategy.

The techniques described herein are implemented to consider and efficiently process a partially ordered set of changes where changes to data occur in multiple independent dimensions (e.g., loop indices or input versions). Using the partially ordered set of changes, different patterns and combinations of computations or sub-computations in a dataflow graph can be accounted for and realized in accordance with partially ordered logical time. Accordingly, the differential dataflow model creates, as an input to one or more computations in a data-parallel program, a lattice-varying collection where a set of differences to collections of data (e.g., the sub-collections that have changed) are indexed and arranged according to a lattice type. The lattice-varying collection comprises different lattice elements which are indexed and used to organize the set of differences to the collections of data. The differential dataflow model can then process the different lattice elements to perform nested fixed-point iterations, incremental updates, and prioritized computations, among other operations. Moreover, the operators and dataflow graphs described herein are capable of responding to updates to the lattice-varying collections so that further appropriate updates are realized and processed within the data-parallel program, until no further updates remain and the data-parallel program and its computations quiesce.

Compared to conventional approaches, the differential dataflow model discussed herein enables programmers to write a data-parallel program with nested loops that respond quickly to incremental changes to the partially ordered set of changes arranged in the lattice-varying collection.

FIG. 1 provides a general overview 100 of the differential dataflow model where differences in collections of data that are partially ordered are accumulated up to a certain point in time t. For example, the accumulated differences may reflect changes to a system over a short period of time (e.g., seconds, minutes), or the accumulated differences may reflect changes to a system over a broader period of time (e.g., days, weeks). In FIG. 1, if X represents collections of data for a model system, then Y is the output collections of data (e.g., new collections of data) after X is processed by one or more computations in a data-parallel program.

FIG. 1 depicts the differences in the collections of data as separate input records, dX (102(A), 102(B), 102(C), 102(D), 102(E), 102(F), 102(G), and 102(H)). As previously discussed, each input record, dX, corresponds to a different change to one or more sub-collections of data in a model system. The input records to not represent the absolute value of the totality of collections of data that pertain to the real world system being modeled for data analysis. The goal of the differential dataflow model 104, via implementation of the data-parallel program 106 (or part of a data-parallel program) that defines a set of operators 108 to perform computations, is to propagate the respective differential input records dX (102(A), 102(B), 102(C), 102(D), 102(E), 102(F), 102(G), and 102(H)) so that the new collections of data output are in line and accurately reflect the differential input records dX. Thus, FIG. 1 depicts the output elements as dY (110(A), 110(B), 110(C), 110(D), 110(E), 110(F), 110(G), and 110(H)).

As depicted in FIG. 1, when processing the separate input records dX (102(A), 102(B), 102(C), 102(D), 102(E), 102(F), 102(G), and 102(H)) corresponding to the respective differences to the sub-collections of data in X, the differential dataflow model 104 creates a lattice-varying collection 112 and organizes or indexes the separate input records in the lattice-varying collection 112, where each input record is a lattice element. The term "lattice" represents an organizational pattern type by which a set of partially ordered differences are arranged so that they can be processed by one or more operators 108 in different combinations and/or orders. Thus, for a particular set of input records dX, the differential dataflow model 104 creates a specific lattice-varying collection that is the actual data indexed in accordance with the lattice type. For example, in various embodiments, the lattice type for FIG. 1 is a two-dimensional grid with 3×3 elements shown. Moreover, the lattice elements may be indexed as tuples of integers as follows: difference record 102(A) is indexed as lattice element (0,0) in the lattice-varying collection 112, difference record 102(B) is indexed as lattice element (0,1) in the lattice-varying collection 112, difference record 102(C) is indexed as lattice element (0,2) in the lattice-varying collection 112, difference record 102(D) is indexed as lattice element (1,) in the lattice-varying collection 112, and so forth.

Because the separate input records in a lattice-varying collection may be a partially ordered set of changes, they may vary in multiple different dimensions that may not be "directly comparable" in linear time-wise manner. For instance, in various embodiment, the lattice elements may be indexed according to tuples of integers in two dimensions, three dimensions, four dimensions and so forth. For example, two different three dimensional lattice elements may be tuples of integers (1, 5, 3) and (2, 1, 9). Here, the individual corresponding coordinates of each tuple may be comparable (e.g., 1 occurs before 2, 5 occurs after 1, and 3 occurs before 9). However, when a data-parallel program considers the entire lattice element for processing, it is confused because some comparisons may indicate the element precedes another element in a time-wise manner, while other comparisons may indicate the element comes after the another element in a time-wise manner, as shown using the tuples (1, 5, 3) and (2, 1, 9). Accordingly, although individual coordinates between lattice elements may be comparable, the entire lattice element may not be directly comparable for data-parallel processing purposes.

As discussed above, a two-dimensional lattice type is depicted in FIG. 1. For example, the elements in the top row of the lattice-varying collection 112, dX records 102(A), 102(B) and 102(C), may reflect separate iterations of a loop in a data-parallel program, and therefore, may be comparable in a time-wise manner, where the first iteration (e.g., the difference record represented by 102(A)) is known to come before the second iteration (e.g., the difference record represented by 102(B)), which is known to come before the third iteration (e.g., the difference record represented by 102(C)). However, lattice element 102(D) may represent a change that modifies where the loop starts in the data-parallel program, thereby adding a second dimension to the lattice-varying collection 112. Accordingly, lattice element 102(D) may not be directly linearly time-wise comparable to difference records 102(A), 102(B) and 102(C) in the top row of the input lattice, and thus, the differential dataflow model 104 will have to process the three aforementioned iterations according to the modified loop starting point. For example, such iterations with the modified loop starting point may be represented by the records 102(D), 102(E), and 102(F) in the second row of the input lattice.

One example way of denoting and indexing the lattice is to label the rows in the lattice as different versions (e.g., 0, 1, and 2), while the columns represent iterations (e.g., 0, 1, and 2). Accordingly, using the lattice-varying collection 112, the differential dataflow model 104 can process a set of partially ordered changes so that the output, dY, appropriately reflects the different possible patterns and combinations of computations and/or sub-computations resulting from the input records, dX.

While FIG. 1 shows the input lattice with three rows and three columns in a two-dimensional lattice type implementation, it is understood in the context of this document, that a lattice-varying collection has no limit on the number of dimensions. Rather, lattice-varying collections are created and indexed to account for each possible difference to the collections of data, so that the output is properly reflected. In various embodiments, the input lattice may be referred to as a lattice version of time according to an unlimited number of dimensions (time×time×time× . . . ).

Accordingly, the differential dataflow model further discussed herein processes a partially ordered set of differences to collections of data that can vary in multiple different dimensions. This allows the differential dataflow model to efficiently stream data and improve the performance of iterative computations and prioritized computations when modeling real world systems and performing dataflow processing.

Illustrative Architecture

Figure 2:
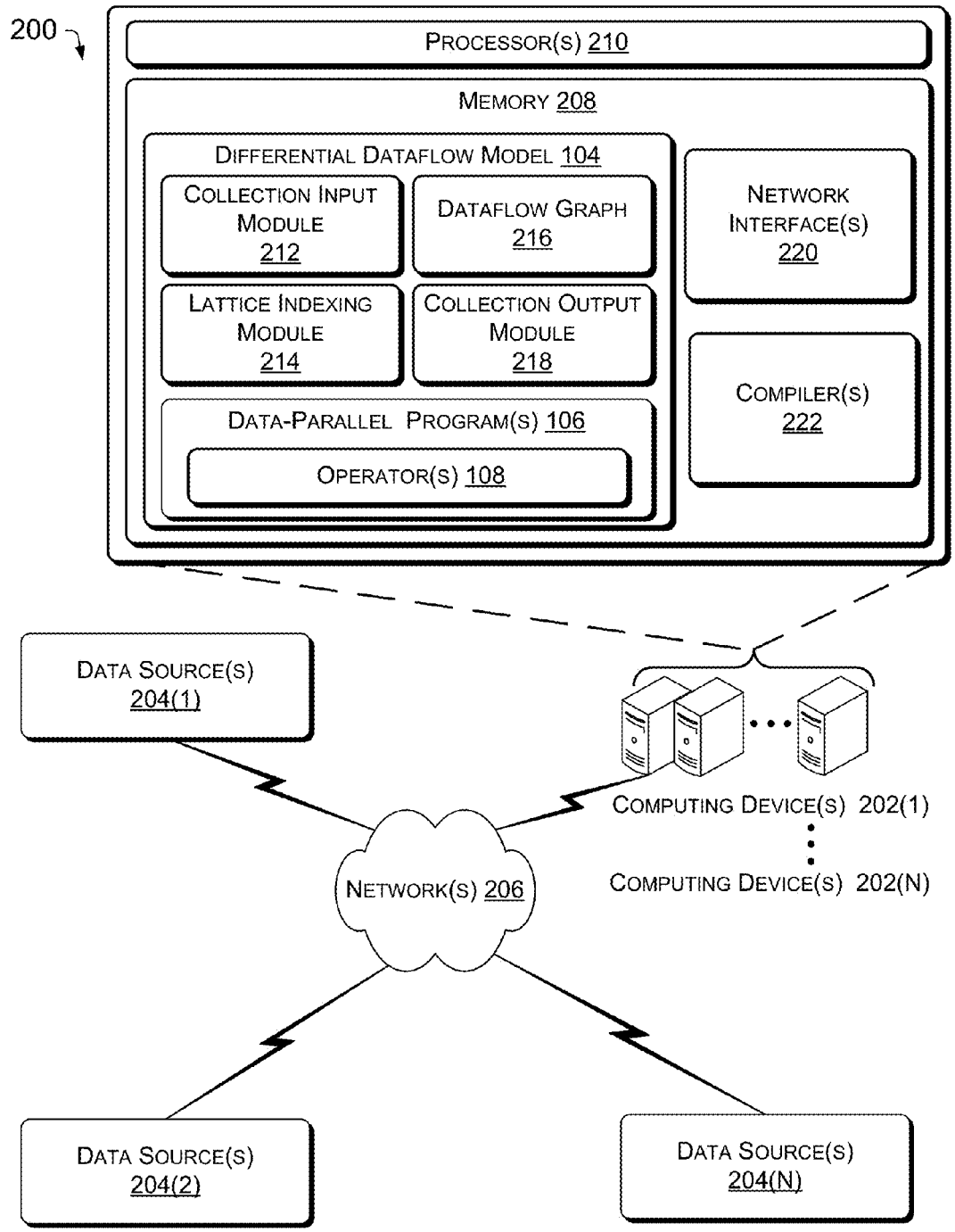
FIG. 2 illustrates example architecture for implementing the described techniques, in accordance with various embodiments.

FIG. 2 shows an illustrative architecture 200 that may employ the described techniques. To this end, architecture 200 includes one or more computing devices 202(1) . . . 202(N) and one or more data sources 204(1) . . . 204(N), each coupled to network(s) 206. In various embodiments, the computing devices 202(1) . . . 202(N) may be server computing devices that perform data-parallel computations. In various embodiments, the one or more data sources 204(1) . . . 204(N) may comprise one of an array of computing devices capable of storing and providing collections of data for a model system and connecting to the one or more network(s) 206, such as a server computer, a client computer, a personal computer, a laptop computer, a mobile phone, a personal digital assistant (PDA), tablets, gaming consoles, set top boxes, and the like. For example, data for a social network system may be globally spread out across different server computers, client computers, mobile phones, etc. Thus, a social network system will have different data sources 204(1) . . . 204(N) located on the network that provide changes to the collections of data for the social network system.

In various embodiments, the architecture 200 can be the World Wide Web, including numerous PCs, servers, and other computing devices spread throughout the world. The computing devices 202(1) . . . 202(N) and the one or more sources 204(1) . . . 204(N) may be coupled to each other in various combinations through a wired and/or wireless network 206, including a LAN, WAN, or any other networking and/or communication technology.

The computing devices 202(1) . . . 202(N) comprise a memory 208 and one or more processors 210. Furthermore, in various embodiments, the computing devices 202(1) . . . 202(N) include the differential dataflow model 104 which may include a collection input module 212, a lattice indexing module 214, a data-parallel program 106 with operators 108, a dataflow graph 216, and a collection output module 218. Furthermore, the computing devices 202(1) . . . 202(N) may include one or more network interface(s) 220 and one or more compilers 222 to compile the data-parallel program 106.

The processor(s) 210 may be a single processing unit or a number of units, all of which could include multiple computing units. The processor(s) 210 may be implemented as one or more microprocessors, microcomputers, microcontrollers, digital signal processors, central processing units, state machines, logic circuitries, shared-memory processors, and/or any devices that manipulate signals based on operational instructions. Among other capabilities, the processor(s) 210 may be configured to fetch and execute computer-readable instructions stored in the memory 208.

The memory 208 may comprise computer-readable media including, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing or server device.

In contrast, communication media may embody computer readable instructions, data structures, program modules, or other data in a modulated data signal, such as a carrier wave, or other transmission mechanism. As defined herein, computer storage media does not include communication media.

The network interface(s) 220 enable network communication, and may include one or more ports for connecting the respective computing device to the network 206. The network interface(s) 220 can facilitate communications within a wide variety of networks and protocol types, including wired networks (e.g. LAN, cable, etc.) and wireless networks (e.g., WLAN, cellular, satellite, etc.). For instance, the network interface(s) may access, over network(s) 206, data stored at the one or more data sources 204(1) . . . 204(N). In various embodiments, computing device(s) 202(1) . . . 202(N) may have local access, independent of a network connection, to one or more data sources 204(1) . . . 204(N).

It is understood in the context of this document, that the functionality performed by the differential dataflow model 104 may be all inclusive on a single computing device 202(1), or spread out amongst a plurality of computing device(s) 202(1) . . . 202(N) connected to one another via network(s) 206. Moreover, elements of the differential dataflow model 104 may be located at one or more of the data sources 204(1) . . . 204(N).

In various embodiments, the collection input module 212 is configured to gather and/or receive one or more collections of data that pertain to the real world system being modeled for dataflow processing. The collections of data gathered and received by the collection input module 212 may pertain to the complete real world system, or the collections of data may pertain to a subset of data of the complete real world system for which dataflow processing, with respect to possible updates, is to be performed. Examples of real world systems include, but are not limited to, social network systems, GPS systems, roadmap systems, SPAM filter systems, or any type of real world computing system where data is constantly updated, added, removed, or modified, and thus, it would be beneficial to perform dataflow processing.

Once the one or more collections of data are received by the collection input module 212, in various embodiments, the differential dataflow model 104 employs the lattice indexing module 214 to determine and index the records of differences in the one or more collections of data according to a particular lattice type.

As previously discussed, a declarative data-parallel program defines computations over strongly typed collections of data. The one or more computations defined by a programmer in the declarative data-parallel program may functionally map the differences in collections of data to integer counts. Accordingly, the differential dataflow model 104 can manipulate collections of data like functions, e.g., collections of data may be added and subtracted (e.g., according to their integer counts) to determine differences in the collections of data, thereby providing the difference records, dX, as discussed above with respect to FIG. 1.

A function that performs a computation on one or more input collections of data to output one or more new collections is performed by the defined operators 108. In various embodiments, the operators 108 express data-parallelism through a key function K, by which input records for a collection of data are grouped. For instance, considering input collections of data A and B with records r, let $A_k$ and $B_k$ be respective restrictions on input records mapping to k under K, as follows:

$$A_k[r]=A[r] \text{ if } K[r]=k, 0 \text{ otherwise.} \quad \text{Equ. (1)}$$

$$B_k[r]=B[r] \text{ if } K[r]=k, 0 \text{ otherwise.} \quad \text{Equ. (2)}$$

An operation $f_K$ performed on A and B satisfies an independence property, as follows:

$$f_K(A, B) = \sum_k f_K(A_k, B_k). \quad \text{Equ. (3)}$$

The independence property in equation (3) allows the computations to be partitioned arbitrarily across threads, processes, and computers as long as elements mapping to the same key are grouped together. However, some operations may be fully data-parallel, meaning that the operations on records are independent, as follows:

$$f(A) = \sum_r f(\{r\}) \times A[r]. \quad \text{Equ. (4)}$$

Fully data-parallel operations can be performed in situ, and therefore, fully data-parallel operations do not require grouping or data-exchange with other operations. Thus, as previously discussed, the conventional approaches to performing data-parallel computations operate on collections of data and result in absolute values of the collections of data themselves, which may then be used in further computation. However, the computations in the conventional approaches are constrained to form a directed acyclic dataflow graph.

In contrast, the differential dataflow model 104 described herein uses the lattice indexing module 214 to create the lattice-varying collection 112 indexing the difference records as elements in accordance with a lattice type, from which the differential dataflow model 104 can process a partially ordered set of changes to collections of data (e.g., the sub-collections of data that have changed) that vary in multiple different dimensions.

In various embodiments, the differential dataflow model 104 processes the partially ordered set of changes using collection traces as functions from the lattice elements to collections of data. The functional dependence of operators between input and output collections extends to collection traces. For example, for a defined operator $f$, the output collection trace must reflect at each t the operator applied to the input collections at t, as follows:

$$f(A,B)[t]=f(A[t],B[t]). \quad \text{Equ. (5)}$$

In various embodiments, this relationship extends from operators to arbitrary sub-computations, and the dataflow graphs further discussed herein will satisfy this property.

With respect to differences between collections of data as discussed above with respect to FIG. 1, the differential dataflow module 104 implements an alternate representation for a collection trace, called a difference trace, which is a function from lattice elements to "differences". A difference is a function from input records to integers, where the value of the function on a record represents the necessary change to the frequency of the associated record. These integers may be negative, indicating a decrement to the frequency of the record. Thus, using differences, the differential dataflow model 104 defines a difference trace, δA, from a collection trace A so that an output collection A[t] results from adding the differences δA[s] for the lattice elements that satisfy s≤t, where t is a given time up to which the difference records are accumulated, as follows:

$$A[t]=\Sigma_{s \leq t} \delta A[s]. \quad \text{Equ. (6)}$$

Each difference trace δA induces a specific collection trace A, but a difference trace δA may also be defined coordinate-wise from A and prior differences as follows:

$$\delta A[t] = A[t] - \sum_{s<t} \delta A[s]. \quad \text{Equ. (7)}$$

Thus, in various embodiments, the lattice indexing module 214 uses collection traces and/or difference traces in accordance with equations (6) and (7), to determine what differences records, dX, to process as part of the lattice-varying collection 112, as depicted in FIG. 1. While a collection trace and its corresponding difference trace represent the same information mathematically, the differential dataflow model 104 uses the difference traces, as further discussed herein, to process changes to collections of data because the difference traces are more compact than collection traces and the difference traces explicitly indicate when and how a collection of data has changed. However, in various embodiments, the differential dataflow model 104 may also use collection traces. Accordingly, the differential dataflow model 104 is able to restrict computations to data that has changed (e.g., independent sub-collections that have changed) while not having to perform redundant computations on data associated with a previous, maintained state that has not changed (e.g., independent sub-collections that have not changed).

Once the lattice indexing module 214 determines the difference records, dX, that comprise the lattice-varying collection 112, the differential dataflow model 104 compiles and executes the data-parallel program 106 defining the operators 108 in accordance with an underlying dataflow graph 216 (e.g., a cyclic dataflow graph) that propagates changes to the collections of data through vertices capable of determining output changes from input changes. Using the lattice-varying collection 112, the differential dataflow model 104 does not require the dataflow graph 216 to develop and/or maintain explicit dependencies between input and output objects.

Generally, the dataflow graph 216 includes edges that correspond to difference traces and vertices that correspond to one of a source, a sink, or an operator 108 that performs one or more computations or sub-computations. A source has no incoming edges, and a sink has no outgoing edges, and thus, they represent a computation's inputs and outputs respectively (e.g., a computation performed by an operator 108).

The result of an operator's computation at a vertex is an assignment of differences traces to the edges so that for each operator vertex in the dataflow graph 216, the difference trace on its output edge reflects the one or more operators 108 applied to one or more difference traces on its input edges, as shown in equation (5).

In various embodiments, the differential dataflow model 104 executes the computations with respect to the dataflow graph 216 based on an assignment of two difference traces to each edge. Initially, all difference traces are empty. The first difference trace is processed by the recipient vertex and is reflected in the output from the computation at the recipient vertex. The second difference trace is unprocessed and calls for attention (e.g., the computation will not be finished until the unprocessed difference trace has been emptied).

The differential dataflow model 104 advances from one configuration to the next in the dataflow graph 216 via one of two scenarios. In a first scenario, a source adds a difference trace to an unprocessed trace on the source's output edge. In a second scenario, an operator vertex subtracts a difference trace from its unprocessed region, adds the difference trace to its processed region, and then adds the difference trace to the unprocessed region of each output edge as appropriate to the logic of the operator. In each configuration, the differential dataflow model 104 requires that each output edge of an operator implementing a function $f$ has its two regions (e.g., processed and unprocessed) of an output trace sum to $f$, which is applied to the processed difference traces on the input edges. The computation quiesces when all unprocessed traces are empty, and thus, each operator's output difference traces are equal to the function $f$ applied to its input difference traces. Therefore, the differential dataflow model 104 does not need to perform more computation unless a source emits a new trace.

In various embodiments, execution of the data-parallel program 106 according to the dataflow graph 216 is atomic. In other embodiments, execution may be in parallel as long as the resulting computation is indistinguishable from a legal serialized execution.

Figure 3:
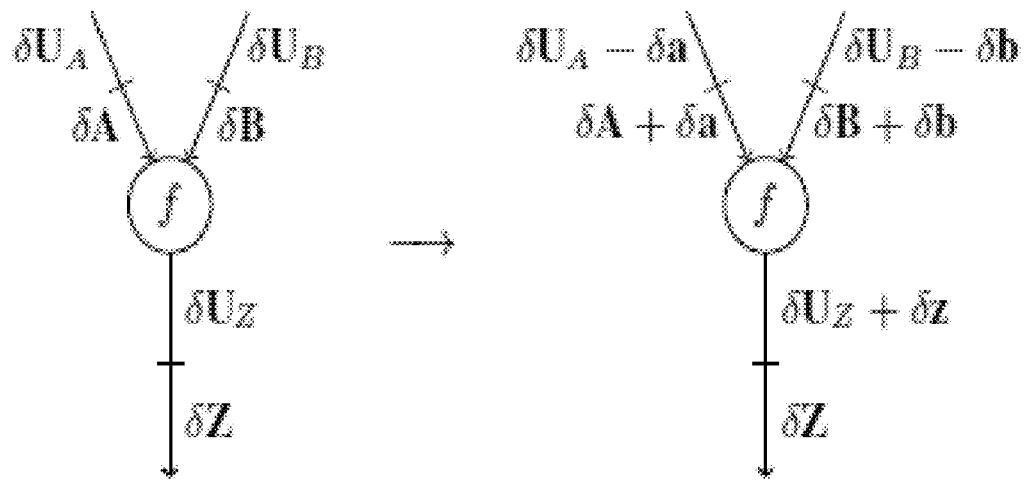
FIG. 3 illustrates example portion(s) of a dataflow graph, in accordance with various embodiments.

In various embodiments, the differential dataflow model 104 updates the difference traces, as depicted in FIG. 3. FIG. 3 depicts an exemplary operator $f$ that is part of the dataflow graph 216. For example, with reference to FIG. 3, the differential dataflow model 104 may define $\delta A$ and $\delta B$ as processed input difference traces and $\delta U_A$ and $\delta U_B$ as unprocessed input differences traces, while defining $\delta a$ and $\delta b$ as intended updates to the input difference traces, such that the differential dataflow model 104 outputs $\delta z$ such that:

$$z = f(A+a, B+b) - f(A,B). \quad \text{Equ. (8)}$$

Following the data-parallel definition of $f$, the differential dataflow model 104 uses keys present in a or b, as follows:

$$z = \sum_{k \in a,b} (f(A_k + a_k, B_k + b_k) - f(A_k, B_k)). \quad \text{Equ. (9)}$$

Thus, the differential dataflow model 104 sets $z_k$ as the term corresponding to k in the sum, and using the equivalence:

$$z_k[t] = \sum_{s \leq t} \delta z_k[s], \quad \text{Equ. (10)}$$

the differential dataflow model 104 can determine $\delta z_k[s]$ as follows, $$\delta z_k[t] = f(A_k + a_k, B_k + b_k)[t] - f(A_k, B_k)[t] - \sum_{s<t} \delta z_k[s]. \quad \text{Equ. (11)}$$

Accordingly, $\delta z_k$ is a coordinate-wise definition when implementing the differential dataflow model 104. For example, if $\delta z_k[t]$ is non-empty for few t, then the differential dataflow only has to evaluate $\delta z_k$ at the lattice elements corresponding to t. Thus, the differential dataflow 104 may conservatively estimate non-empty t from the least upper bounds of non-empty t in $\delta A_k$, $\delta a_k$, $\delta B_k$, and $\delta b_k$.

In various embodiments, the differential dataflow model 104 implements a library of declarative language operators which may be selectively used in the data-parallel program(s) 106, which are each configured for a particular system and/or a particular dataflow task. However, it is understood in the context of this document that the differential dataflow model 104 and the data-parallel program(s) 106 may also define additional and other operators to perform computations on the input records, dX, depicted as the lattice elements in FIG. 1.

For example, in at least one embodiment the operators 108 are based on Language Integrated Query (LINQ) functionality in .NET languages. In LINQ, collections of data for a system are represented by strongly-typed collections of .NET objects, and the example operators 108 are functions transforming data input collections to data output collections. Accordingly, while specific operators are further discussed herein, it is understood in the context of this document, that the LINQ functionality in .NET languages may also provide and/or support additional operators to be used in conjunction with the techniques discussed herein.

The operators 108 discussed herein are divided into four classes: unary operators, binary operators, a fixed-point operator, and a prioritized operator.

The unary operators may include, but are not limited to, 'Select', 'Where', 'Groupby', and 'Reducer'. The 'Select' operator produces an output collection that results from mapping a given function or computation across each element in an input collection, as follows:

Collection<T,L> Select<S,T,L> (Collection<S,L> input, Func<S,T> selector).

Here, the type parameters S and T correspond to the record types in the input and the output, respectively (e.g., medical records, strings, integers, web pages, online presence status). For example, S is a "source" data-type and T is a "target" data-type. The selector is a function from S to T (e.g., an operator that changes the source data-type records S to the target data-type records T). The operator and the input collection and the output collection are also parameterized by L, e.g., a placeholder for the lattice type. With respect to equations (6) and (7), L is the lattice type over which the variable t ranges. With respect to FIG. 1, L would be the set of all pairs of tupled integers corresponding to the two-dimensional arrangement depicted, as previously discussed. In various embodiments, the 'Select' operator does not change the lattice elements associated with the input records, dX, so that the compiler 222 can statically determine and report bugs arising from lattice misuse.

The 'Where' operator produces an output collection containing records in the input collection satisfying a given predicate, as follows:

Collection<T,L> Where<T,L> (Collection<T,L> input, Func<T, bool> predicate).

Again, the type parameter T corresponds to the target datatypes in the output collection and the Boolean value indicates whether the predicate is satisfied. The 'Where' operator is also parameterized by the lattice type, L, as discussed above. In various embodiments, the 'Where' operator does not change the lattice elements associated with the input records, dX.

The 'Groupby' operator takes an input collection, a key function, and a reduction function from groups to output lists. The Groupby operator then collates the input by key, applies the reduction function to each group, and accumulates the result, as follows:

Collection<T,L> GroupBy<S,K,T,L> (Collection<S,L> input, Func<S, K> key, Func<K,IEnumerable<S>, IEnumerable<T>> Reducer).

The 'Groupby' operator is also parameterized by the lattice type, L, as discussed above. In various embodiments, the 'Groupby' operator does not change the lattice elements associated with the input records, dX.

In various embodiments, the 'Reducer' operator is a function from the key and a group of input records to an IEnumerable<T> of output records, and the 'Reducer' operator is not parameterized by the lattice type, L. Rather, IEnumerable<T> is a generic interface in .NET representing a collection of objects that can be enumerated by an iterator, and IEnumerable<T> allows a programmer the flexibility to express the reducer as a LINQ query.

In various embodiments, the differential dataflow model 104 uses a declarative language that defines data-parallel versions of aggregation operators including a 'Count' operator, a 'Sum' operator, and a 'Min' operator, which are based on their LINQ counterparts with an additional key function.

The binary operators may include, but are not limited to, 'Join', 'Concat', 'Union', 'Intersect', and 'Except'. For example, the 'Join' operator may be based on a relational equi-join operator, ⋈, which logically computes a cartesian product of two input collections and outputs pairs of records which map to the same key, as follows:

Collection<R,L> Join<S,T,K,R,L> (Collection<S,L> input1, Collection<T,L> input2, Func<S,K> key1, Func<T,K> key2, Func<S,T,R> Selector)

In various embodiments, the differential dataflow model 104 applies the 'Join' operator to the function 'Selector' to be used on each pair of records with matching keys. Both input collections have the same lattice type, L, ensuring that both collections vary with lattices for which the ≤, 'Join' and 'Meet' operators are well-defined.

Moreover, in various embodiments, the differential dataflow model 104 defines the 'Concat', 'Union', 'Intersect', and 'Except' operators as multi-set operators that are functions of the frequency of each lattice element in either the input collections or the output collections. For example, 'Concat' produces an output collection where the frequencies of each lattice element in either the input collections or the output collections are added, as follows:

Collection<T,L> Concat<T,L> (Collection<T,L> input1, Collection<T,L> input2)

Similarly, the 'Union', 'Intersect', and 'Except' binary operators have the same type, and can be defined analogous to the 'Concat' operator. Moreover, similar to the unary operators, the binary operators ('Join', 'Concat', 'Union', 'Intersect', and 'Except') are also parameterized by the lattice type, L, as discussed above. In various embodiments, these operators do not change the lattice elements associated with the input records, dX, so that the compiler 222 can statically determine and report bugs arising from lattice misuse.

In various embodiments, the 'Fixed-Point' operator is a declarative operator specifying a potentially unbounded iteration. Thus, a programmer may define, in a data-parallel program 106, an input collection and a function that will be repeatedly applied to the input collection until a fixed point is reached, as follows:

Collection<T,L> FixedPoint<T,L,M> (Collection<T,L> input, Func<Collection<T,M>, Collection<T,M>> f)

In various embodiments, the Fixed-Point operator returns $f^\infty$ (input). For example, if the repeated application of $f$ to an input collection has a fixed point, there will exist an iteration number n such that $f^i$ (input)=$f^{i+1}$ (input) for all i≥n. If this does not hold true, there may be no fixed point and the result of the Fixed-Point operator may be undefined and the computation may diverge.

In various embodiments, the Fixed-point operator uses a lattice type, M, that is different than the original lattice type L. In various embodiments, the lattice type M introduces a new integer to pair with an element from L where the new integer tracks the loop iterations. For example, the differential dataflow model 104 may infer the lattice type M via a C# compiler, and the lattice type M may be obtained by augmenting an element of the original lattice type L with an additional integer component that corresponds to the current iteration count. The differing lattice types have a consequence that, if the body of Fixed-Point operator refers to a Collection<T,L> from an enclosing scope, that lattice elements in that collection are extended to elements of M, which, the differential dataflow model can achieve using a unary 'Extend' operator in LINQ. Accordingly, the compiler 222 can detect violations of this invariant with the use of strongly-typed lattice elements.

In various embodiments, the 'Prioritize' operator uses a lattice-based order (e.g., priority queue) to prioritize the lattice elements to be processed, as follows:

Collection<T,L> Prioritize<T,L,P> (Collection<T,L> input, Func<T,int> priority, Func<Collection<T,P>, Collection<T,P>> f)

Accordingly, the Prioritize operator extends the lattice element associated with each record in the input, and reverts to the original lattice in the output. In various embodiments, the priority function defined by the Prioritize operator associates an integer with each input record, dX, and the Prioritize operator constructs a record in a new lattice-varying collection, P, based on the integers. The effect of this prioritization is realized when an operator $f$ contains a Fixed-Point operator 406. In this scenario, the input records will be ordered first by priority and then injected into the body of the Fixed-Point operator, instead of their initially assigned time in the lattice L. When the differential dataflow model 104 processes the high-priority elements first, there is less variation in the input collections and the difference traces will be more compact and require less computation.

As discussed above, when executing a data-parallel program 106, the differential dataflow model transforms the operators 108 defined in the data-parallel program 106 into a dataflow graph 216. In various embodiments, the dataflow graph 216 is a cyclic dataflow graph.

Figure 4:
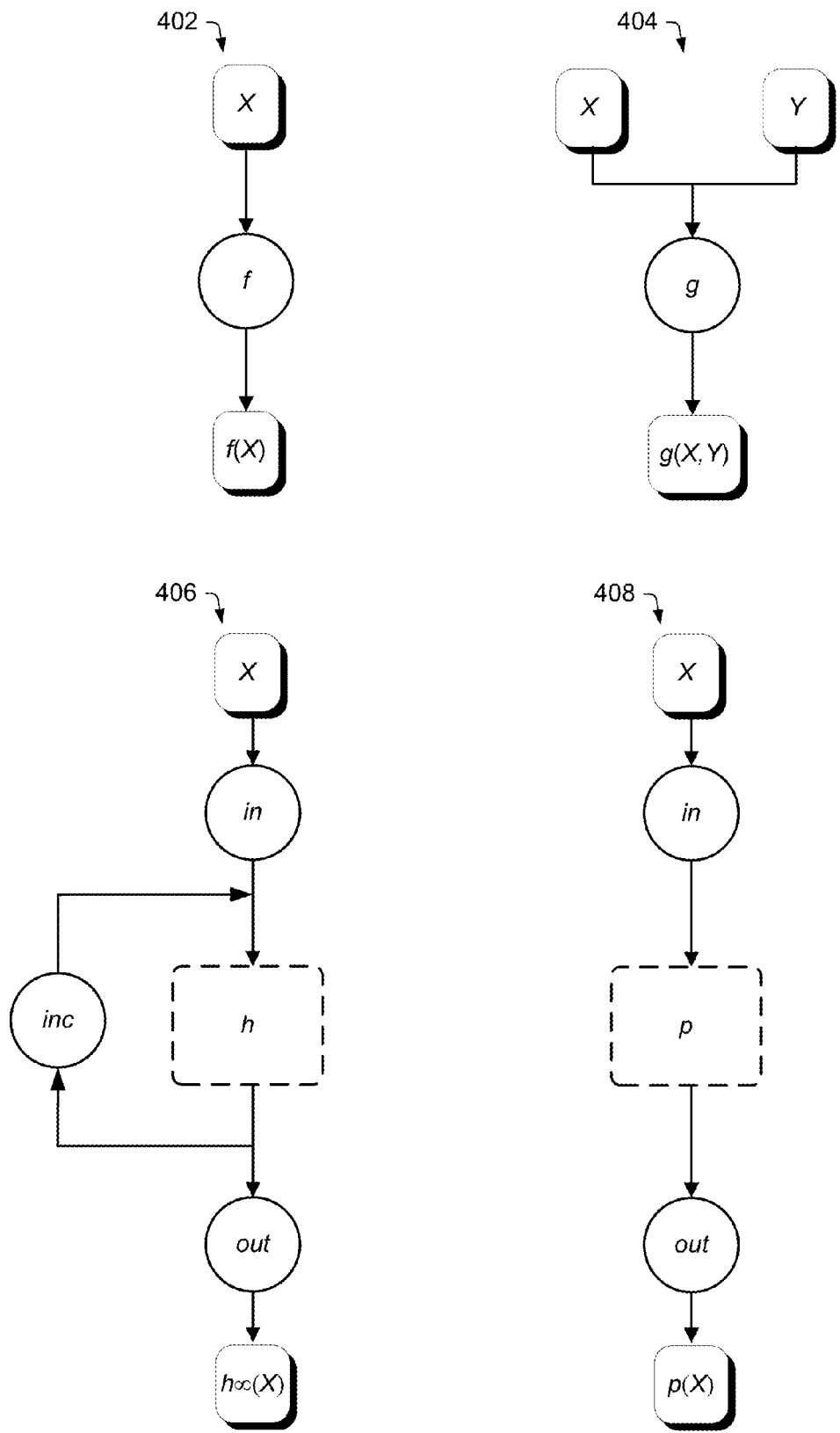
FIG. 4 illustrates example portion(s) of a dataflow graph, in accordance with various embodiments.

FIG. 4 depicts example dataflow graphs (e.g., sub-graphs or elements of the complete dataflow graph 216) for the four classes of operators that may be used in the data-parallel program 106, as previously discussed. A unary operator dataflow graph is depicted in 402, a binary operator dataflow graph is depicted in 404, a fixed-point operator dataflow graph is depicted in 406 (e.g., where the dashed box represents a sub-query h), and a prioritized operator dataflow graph is depicted in 408 (e.g., where the dashed box represents a sub-query p).

In various embodiments, the unary operator dataflow graph 402 receives a single input X, performs one or more computations on X via one or more operators $f$, and outputs the results $f(X)$. The binary operator dataflow graph 404 receives two inputs X and Y, performs one or more computations on X and Y via one or more operators g, and outputs the results g(X, Y).

In various embodiments, the Fixed-Point operator may introduce a cycle that generates the Fixed-Point dataflow graph 406. The Fixed-Point dataflow graph contains an operator on the feedback path that advances the lattice element associated with each record, so cyclic iterations can be performed. The differential dataflow model 104 may ensure termination of a Fixed-Loop dataflow graph 406 by allowing vertices to delay their scheduling until all causally prior differences are retired, and only process the causally least difference in their input. This ensures that any difference processed by the Fixed-Point operator will not be cancelled at a future point, unless a source introduces a new difference.

The Fixed-Point dataflow graph 406 shows that the Fixed-Point operator is instantiated not by a single vertex, but rather by a sub-graph. For example, the differential dataflow model 104 uses an edge in the dataflow sub-graph to connect the input with the output. In various embodiments, the differential dataflow model 104 introduces an ingress vertex in the Fixed-Point dataflow graph 406 that extends to the lattice elements associated with incoming records, dX.

For instance, for each record (x, t) received as input to the Fixed-Point operator dataflow graph 406, the ingress vertex emits two outputs, (x, (t, 1)) and −(x, (t, 2)), which correspond respectively to a positive-weighted version of x in a first iteration of the dataflow graph 406, and a negative version of x in the second iteration of the dataflow graph 406. The Fixed-Point dataflow graph 406 may then be applied to the output of the ingress vertex. Since there are positive-weighted and negative-weighted copies of the input collections, the result of the first iteration will contain f(X) at time (t, 1) and −f(X) at time (t, 2). In various embodiments, the output of the Fixed-Point dataflow graph 406 is linked to an 'incrementer' vertex that transforms a record x at time (t, i) into x at (t; i+1), and feeds the result back into the Fixed-Point dataflow graph 406. At the beginning of the second iteration for the Fixed-Point dataflow graph 406, the inputs tagged with (t, 2) include f(X) from the incrementer and (−X) from the ingress vertex. The Fixed-Point dataflow graph 406 results tagged with (t, 2) are therefore $f(f(X))-f(X)$, which are incremented and returned as input. Generally, the Fixed-Point operator graph inputs tagged with (t; i) are equal to $f^{i-1}(X)-f^{i-2}(X)$. The incrementer vertex may delay scheduling or processing as long as possible, and may increment the least index i in the input, thereby ensuring that $f^{i-1}(X)-f^{i-2}(X)$ is iteratively propagated through the Fixed-Point operator dataflow graph 406.

Accordingly, the Fixed-Point operator loop ceases to propagate updates once a fixed point has been achieved, while only propagating necessary updates in the iterative process. Moreover, the Fixed-Point dataflow graph 406 includes an output which exits the iterative loop index, thereby turning the records (x, (t, i)) into (x; t). The accumulation of all output increments collapses at the final iteration, and the fixed point is achieved.

In various embodiments, the Prioritize operator generates the Prioritize operator graph 408. The Prioritize operator graph 408 also has an ingress vertex which introduces a lattice element selected by the priority function followed by the p function, followed by an output vertex that strips off the lattice element that was introduced in the ingress vertex. The ingress vertex optionally delays processing difference records, dX, in its input until all records with higher priority have been flushed through the p function and reached the egress.

In various embodiments, the differential dataflow model 104 executes the data-parallel program 106 and creates the dataflow graph 216 by partitioning the state and computation of one or more data-parallel operations across multiple different threads. This allows a scalable implementation that applies to data maintained at multiple different computers (e.g., the different data sources in FIG. 2) rather than a shared memory system. Thus, in various embodiments, the differential dataflow model 104 partitions the state via worker threads that communicate messages to one another.

For example, the differential dataflow model 104 may extract data-parallelism through application of equation (3). The differential dataflow model 104 may determine a degree of parallelism p, replacing each vertex in the dataflow graph 216 with p independent sub-vertices, each responsible for a 1/p fraction of keys k. Then, the differential dataflow model 104 may replace each directed edge by p×p directed edges between source and destination sub-vertices. The differences produced by source sub-vertices may be partitioned by the destination key function, and directed to appropriate destination sub-vertices.

In various embodiments, the differential dataflow model 104 starts p worker threads, each of which is assigned one of the sub-vertices of each logical vertex in the dataflow graph 216. The sub-vertices operate independently, coordinated through messages communicated between the worker threads. The scheduling strategy for the sub-vertices is to repeatedly activate their first sub-vertex with unprocessed input differences and each of the sub-vertices process all appropriate input differences according to respective delay policies, thereby producing any necessary output differences.

To implement the data-parallelism, the differential dataflow model 104 repeatedly presents each sub-vertex with unprocessed input difference traces. Furthermore, the differential dataflow model tasks each sub-vertex with producing output difference traces. Accordingly, the output:

$$\delta z = \sum_k \delta z_k, \qquad \text{Equ. (12)}$$

should satisfy equation (11), discussed above and reproduced here:

$$\delta z_k[t] = f(A_k + a_k, B_k + b_k)[t] - f(A_k, B_k)[t] - \sum_{s<t} \delta z_k[s]$$

For example, an implementation could index δA and δB by key k, such that random access to $A_k$ and $B_k$ results. Thus, the differential dataflow model 104 can compute $\delta z_k$ using the following pseudo-code for sub-vertex updates.

```
dz ← 0
for all keys k ∈ da or db do
    for all elements t ∈ lattice do
        Ak ← ak ← 0
        Bk ← bk ← 0
        for all elements s ∈ lattice do
            if s ≤ t then
                Ak ← Ak +dA[k][s]
                Bk ← Bk +dA[k][s]
                ak ← ak +da[k][s]
                bk ← bk +db[k][s]
                dz[k][t] ← dz[k][t] – dz[k][s]
            end if
        end for
        dz[k][t] ← dz[k][t] + f(Ak+ak, Bk+bk)–f(Ak, Bk)
    end for
end for
return dz
```

Reconstructing $A_k$ and $a_k$ for each lattice element t is expensive and unnecessary. Thus, in various embodiments, the differential dataflow model optimizes equation (11) by determining $\delta z_k[t]$ at few lattice elements. For example, the differential dataflow model 104 may approximate a t for which $\delta z_k[t]$ is non-zero from the non-zero t in $\delta a_k$ and $\delta A_k$. In particular, an update can occur at a t that is the join of a set of times present in $\delta a_k$ or $\delta A_k$, at least one of which must be from $\delta a_k$. A lattice element t that is not such a join is greater than some elements in the inputs, but strictly greater than their join. Consequently, the collection at t equals the collection at the join, and there is no difference to report. If t is not greater than some update, our definition of $\delta z_k[t]$ indicates it is empty.

In other embodiments, rather than reconstructing $A_k$, the differential dataflow model 104 maintains $A_k$. For example, when moving from $A_k[s]$ to $A_k[t]$ the differential dataflow model 104 incorporates differences from:

$$\{\delta A_k[r]:(r\leq s)\neq(r\leq t)\}. \quad \text{Equ. (13)}$$

This often results in relatively few r in difference, often just one in the case of loop indices.

In various embodiments, the differential dataflow model 104 takes the meet of update lattice elements. For example, as a computation proceeds and the differential dataflow model 104 returns to a sub-vertex, the meets of lattice elements in $\delta a_k$ increases, tracking the current loop index. The differences $\delta A_k$ occurring before the meet are included in all t and therefore, do not need to be revisited. The only differences of $\delta A_k$ of interest are those at lattice elements at least the meet of lattice elements $\delta a_k$.

Illustrative Processes

Figure 5:
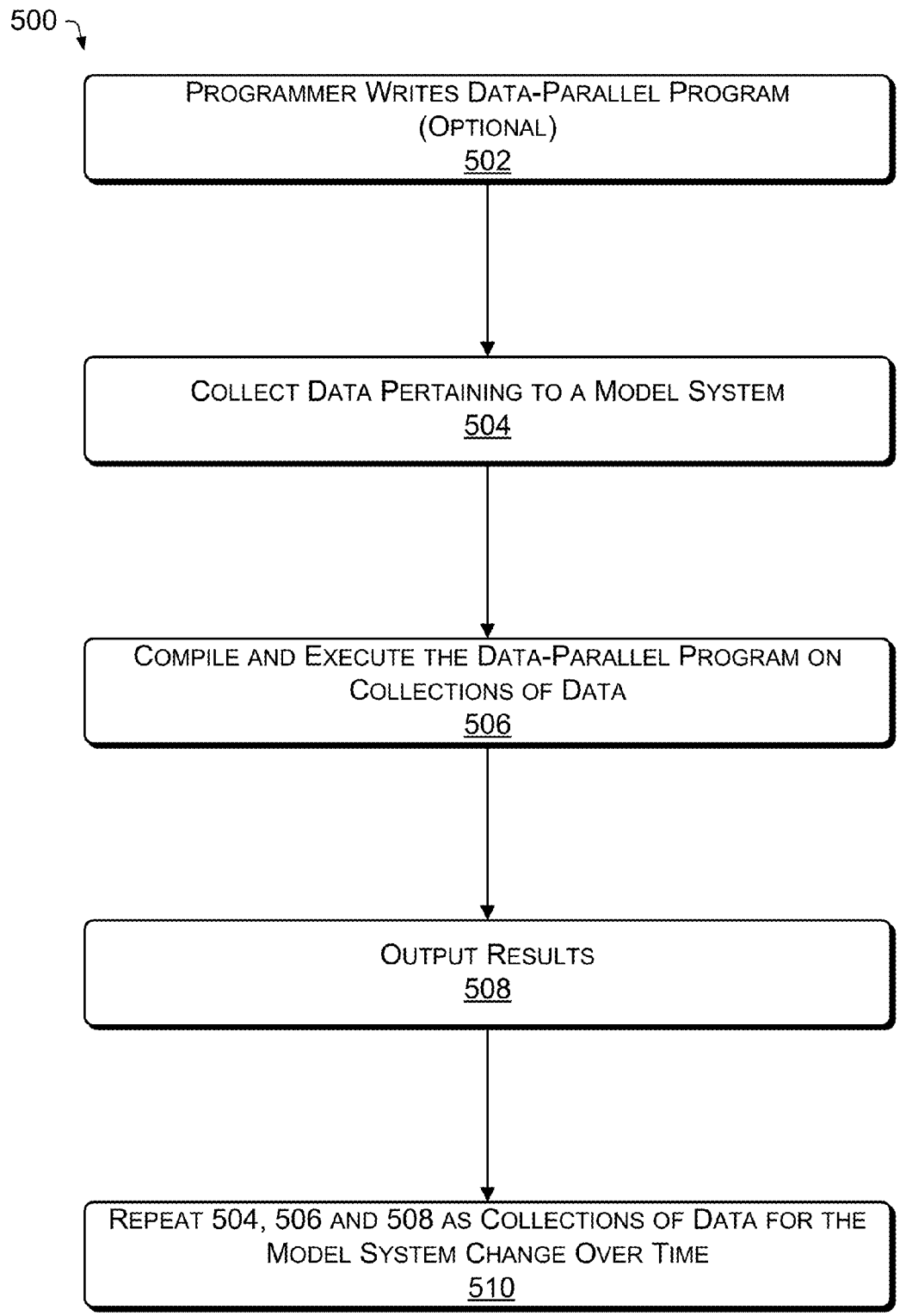
FIG. 5 illustrates an example process for executing a data-parallel program in accordance with the techniques discussed herein.

Example operations are described herein with reference to FIG. 4 and FIG. 5. The processes are illustrated as logical flow graphs, which represent a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 5 illustrates an example process 500 for executing a data-parallel program in accordance with the techniques discussed herein.

At operation 502, a programmer writes a data-parallel program 106 that defines a set of operators 108 that perform computations for a dataflow processing task for a particular real world system to be modeled (e.g., a social network system).

For example, data-parallel programs may define algorithms and/or operators that process data, according to a lattice type. In various embodiments, a data-parallel program computes a single-source shortest paths algorithm in which each node in a model system repeatedly broadcasts its distance from the source to all of its neighbors and each node accumulates incoming messages and selects a minimum value. In other embodiments, a data-parallel program computes a connected components algorithm that converges when every node in a connected component holds the same label.

At operation 504, the collection input module 212 collects or identifies data pertaining to the real world system. At operation 506, the differential dataflow model 104 compiles and executes the data-parallel program 106. At operation 508, the collection output module 218 outputs the new collections of data (e.g., the results of the computations) so that data processing can be performed.

Optionally, at 510 operations 504, 506, and 508 may be repeatedly performed as the collections of data pertaining to the real world system change over time (e.g., seconds, minutes, hours, days, months).

Figure 6:
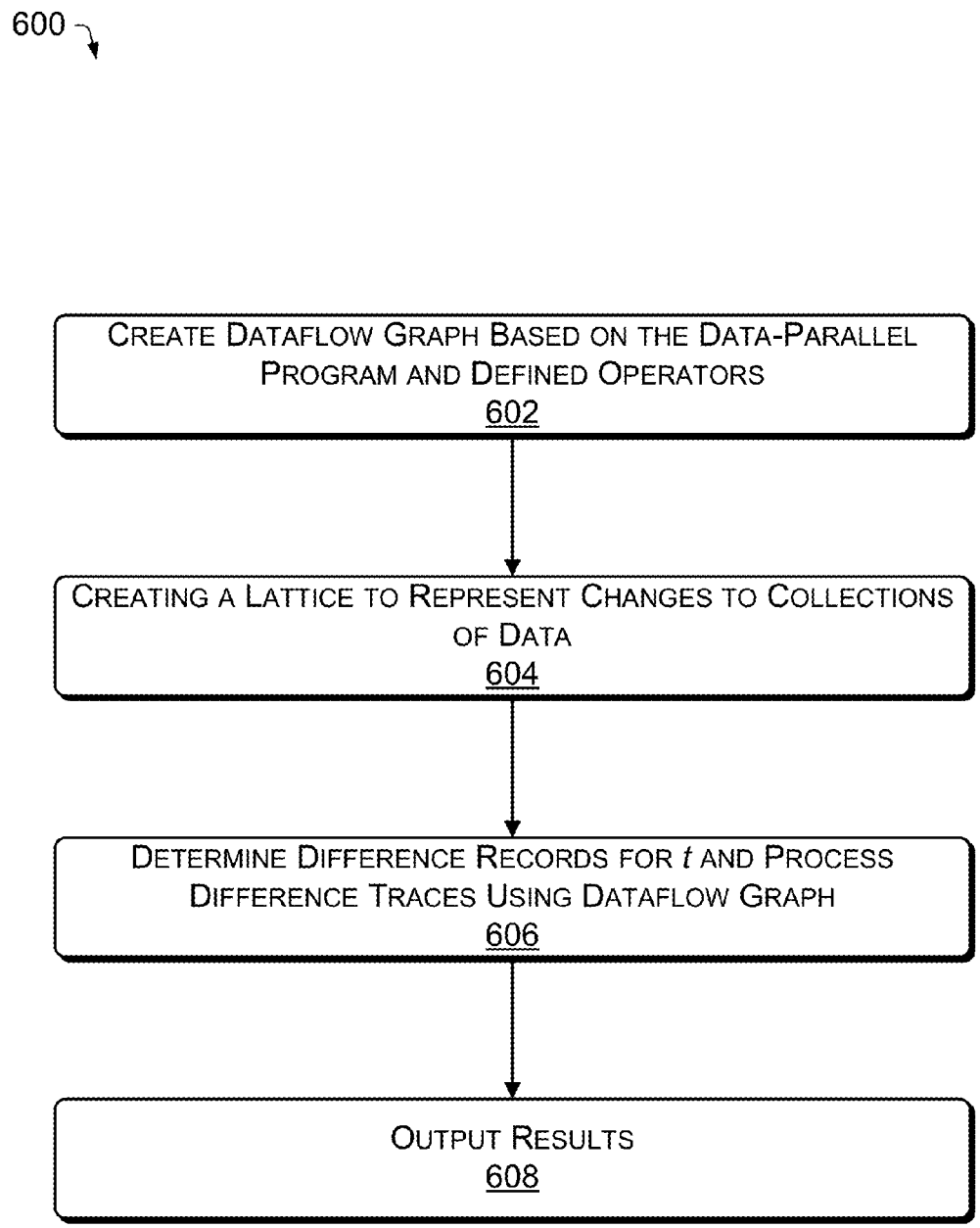
FIG. 6 illustrates an example process for executing a data-parallel program in accordance with the techniques discussed herein.

FIG. 6 illustrates an example process 600 that shows how the differential dataflow model 104 executes the data-parallel program 106 (e.g., operation 506 in FIG. 5). At operation 602, the differential dataflow model 104 creates a dataflow graph 216 to model and perform the computations defined by the operators 108 in the data-parallel program 106.

At operation 604, the differential dataflow model 104 uses the lattice indexing module 214 to create a lattice representing changes to collections of data for a real world system.

At operation 606, the differential dataflow model 104 determines a partially ordered set of difference records as lattice elements for a given t, and processes the difference traces using the dataflow graph.

At operation 608, output corresponding to the different combinations and/or patterns resulting from processing the difference traces.

CONCLUSION

Although the subject matter has been described in language specific to structural features and/or methodological acts, it is to be understood that the subject matter defined in the appended claims is not necessarily limited to the specific features or operations described above. Rather, the specific features and operations described above are described as examples for implementing the claims.

The invention claimed is:
1. A method comprising:
under control of a processor configured with computer-executable instructions, receiving a collection of data associated with a real world computing system;

determining a plurality of changes to the collection of data;

representing the plurality of changes to the collection of data as elements in a lattice, wherein the lattice represents an organizational pattern type by which the plurality of changes are arranged so that the plurality of changes can be processed by one or more operators in different combinations;

defining the one or more operators in a data-parallel program;

modeling, during execution of the data-parallel program, the one or more operators in a dataflow graph that propagates the plurality of changes to the collection of data through a plurality of vertices; and determining an output collection of data based at least in part on performing one or more computations on one or more of the elements in the lattice using the one or more operators.

2. The method recited in claim 1, wherein at least a portion of the elements in the lattice are not directly time-wise comparable.

3. The method recited in claim 1, wherein the lattice is a multi-dimensional lattice where elements are time-wise comparable in a first dimension but not time-wise comparable in a second dimension.

4. The method recited in claim 1, wherein at least one operator defined in the data-parallel program is a Fixed-Point operator that applies a function to one or more of the plurality of changes to the collection of data until a fixed point is reached.

5. The method recited in claim 1, wherein at least one operator defined in the data-parallel program is a Prioritize operator that orders one or more of the plurality of changes to the collection of data based on priority.

6. The method recited in claim 1, wherein the one or more operators perform a single-source shortest paths algorithm or a connected components algorithm.

7. The method recited in claim 1, wherein the one or more computations perform an incremental update to the real world computing system.

8. The method recited in claim 1, wherein the real world computing system includes at least one of: a social network system, a roadmap system, a global positioning system or a spam filter system.

9. One or more computer storage media storing computer executable instructions that, when executed by one or more processors, program the one or more processors to:

identify a plurality of difference records for an input collection of data associated with a real world computing system, where the plurality of differences records are a partially ordered set of differences;

create a lattice with multiple elements, wherein each element corresponds to one of the plurality of difference records and wherein the lattice represents an organizational pattern type by which the plurality of differences records are arranged so that the plurality of differences records can be processed by one or more operators in different combinations;

define the one or more operators in a data-parallel program;

model, during execution of the data-parallel program, the one or more operators in a dataflow graph that propagates the plurality of difference records through a plurality of vertices; and determine an output collection of data based at least in part on performing one or more computations on one or more of the multiple elements in the lattice using the one or more operators.

10. The one or more computer storage media recited in claim 9, wherein at least a portion of the multiple elements are not directly time-wise comparable.

11. The one or more computer storage media recited in claim 9, wherein the lattice is a multi-dimensional lattice where elements are time-wise comparable in a first dimension but not time-wise comparable in a second dimension.

12. The one or more computer storage media recited in claim 9, wherein at least one operator defined in the data-parallel program is a Fixed-Point operator that applies a function to one or more of the plurality of difference records until a fixed point is reached.

13. The one or more computer storage media recited in claim 9, wherein at least one operator defined in the data-parallel program is a Prioritize operator that orders one or more of the plurality of difference records based on priority.

14. The one or more computer storage media recited in claim 9, wherein the data-parallel program programs the one or more processors to perform a dataflow processing task on a model system.

15. The one or more computer storage media recited in claim 9, wherein the real world computing system includes at least one of: a social network system, a roadmap system, a global positioning system or a spam filter system.

16. A system comprising:

one or more processors;

one or more computer memories, coupled to the one or more processors and storing:

a collection input module, executable by the one or more processors, that programs the one or more processors to receive one or more collections of data associated with a real world computing system;

a lattice indexing module, executable by the one or more processors, that programs the one or more processors to determine a set of difference records for the one or more collections of data and that arranges the set of differences records to be processed by one or more operators in different combinations;

a data-parallel program that programs the one or more processors to define the one or more operators configured to receive a portion of the set of difference records and perform computations on the portion of the set of difference records;

a dataflow graph that is generated by the one or more processors in response to execution of the data-parallel program by the one or more processors, the dataflow graph modeling the one or more operators via one or more vertices; and a collection output module, that programs the one or more processors to output one or more updated collections of data based at least in part on the portion of the set of difference records propagated through the one or more vertices of the dataflow graph.

17. The system as recited in claim 16, wherein the lattice indexing module further programs the one or more processors to arrange the set of differences according to a lattice type, wherein the lattice type is a multi-dimensional lattice where a first dimension is not time-wise comparable to a second dimension.

18. The system as recited in claim 16, wherein the real world computing system includes at least one of: a social network system, a roadmap system, a global positioning system or a spam filter system.

* * * * *